(12) United States Patent
Homme

(10) Patent No.: US 7,674,050 B2
(45) Date of Patent: Mar. 9, 2010

(54) LENS BARREL AND CAMERA INCORPORATING THE SAME LENS BARREL

(75) Inventor: Shigeo Homme, Hachioji (JP)

(73) Assignee: Konica Minolta Opto, Inc., Tokyo (JP)

( * ) Notice: Subject to any disclaimer, the term of this patent is extended or adjusted under 35 U.S.C. 154(b) by 306 days.

(21) Appl. No.: 11/398,877

(22) Filed: Apr. 6, 2006

(65) Prior Publication Data

US 2006/0233543 A1    Oct. 19, 2006

(30) Foreign Application Priority Data

Apr. 15, 2005   (JP) .............................. 2005-118100

(51) Int. Cl.
    *G03B 5/02*   (2006.01)
(52) U.S. Cl. ...................... 396/349; 396/75; 348/208.11
(58) Field of Classification Search ................. 396/349, 396/75; 348/208.11
    See application file for complete search history.

(56) References Cited

U.S. PATENT DOCUMENTS

2004/0227844 A1* 11/2004 Sakamoto .................... 348/357
2005/0036777 A1*  2/2005 Nomura et al. ............... 396/73
2005/0185297 A1*  8/2005 Omiya et al. ................ 359/704
2005/0254140 A1* 11/2005 Sakamoto .................... 359/695

FOREIGN PATENT DOCUMENTS

JP        2004-317943        11/2004

OTHER PUBLICATIONS

Omiya et al., Application No. 2003-114271, Filing Date: Apr. 18, 2003, Publication No. JP 2004-317943, Publication Date: Nov. 11, 2004, English Translation.*

* cited by examiner

*Primary Examiner*—Melissa J Koval
*Assistant Examiner*—Fang-Chi Chang
(74) *Attorney, Agent, or Firm*—Cohen Pontani Lieberman & Pavane LLP

(57) ABSTRACT

A lens barrel including an image capturing optical system, to be extended for image capturing and to be retracted for carrying, including: a first lens unit for capturing an image of a subject; a light-amount control member to control an amount of light which comes from the subject and passes through the image capturing optical system; and second lens unit including at least two lens units which sandwich the light-amount control member on the optical axis; wherein when the lens barrel is extended for image capturing, the first lens unit and the second lens unit exist on the optical axis, while the light amount control member is sandwiched between the two lens units of the second lens unit on the optical axis, and when the lens barrel is retracted, the second lens unit is shifted to the position out of the optical axis.

8 Claims, 5 Drawing Sheets

LENS BARREL AND CAMERA INCORPORATING THE SAME LENS BARREL

This application is based on Japanese Patent Application No. 2005-118100 filed on Apr. 15, 2005, with the Japanese Patent Office, the entire content of which is hereby incorporated by reference.

TECHNICAL FIELD

The present invention relates to a retractable lens barrel, and in particular, to a lens barrel in which an image capturing optical system, including many structuring lenses such as a zoom lens, can be retracted into a thin model.

BACKGROUND OF THE INVENTION

In the past, in order to make cameras to be conveniently portable, the cameras grow popular ones adapted with a retractable lens barrel, wherein the interval between the lens units is shortened so that the lens barrel can be reduced in length.

Further, in the recent years, such lens barrels are structured in such a way that the interval between each optical element of the image capturing optical system is reduced in the optical axial direction, as well as some optical elements are shifted off axial to the other elements, so that the lens barrel is structured to be shorter.

Concerning the above lens barrel, the camera incorporating such a lens barrel is disclosed. That is, the lens units sandwiching a light-amount control member are shifted adjacent to a front group lens, while another lens unit is shifted into a position in a concave section of a member to support an image capturing element, in which the position where the latter lens unit is shifted is different from that of the former lens units (see Patent Document 1).

[Patent Document 1] Unexamined Japanese Patent Application Publication No. 2004-317943 (FIGS. 34-44).

In the lens barrel described in Patent Document 1, it is possible to shorten the length of the lens barrel, because the plural lens units are shifted when the lens barrel is retracted.

However, in case that plural lens units are shifted in different directions out of the optical axis, and returned onto the optical axis for image capturing, it is very difficult to accurately re-position the plural lens units on the optical axis, and still further, repetitive errors are generated so that an image capturing characteristics of each camera may differ. In particular, if the lens units, placed while sandwiching the light-amount control members, such as a shutter and an aperture diaphragm, are shifted and returned, the image capturing characteristics change abnormally, and thereby periphery image quality becomes uneven, which is a drawback.

SUMMARY OF THE INVENTION

To overcome the above drawback, an object of the present invention is to obtain the lens barrel wherein the plural lens units, sandwiching the light-amount control member by a lens facing the subject and a lens facing the formed image, are shifted from the optical axis so that the lens barrel can become shorter after retraction, and when the plural shifted lens units return onto the optical axis for image capturing, they can be accurately re-positioned in the optical axis, and further, positional repetition errors do not occur so that the image capturing characteristics do not differ in each lens barrel, yet further, another object of the present invention is to obtain the cameras, incorporating the above lens barrel, image capturing characteristics of which do not differ each other.

The above object is overcome by the following structures.

Structure 1

A lens barrel, including:

an image capturing optical system structured of plural lens units; and plural lens barrel members which support the image capturing optical system and extend and retract the lens barrel;

wherein when the lens barrel is retracted, predetermined lens units (being second lens units) are shifted to positions out of the optical axis of the plural lens units, the lens barrel is characterized in that the predetermined lens units sandwich a light-amount control member to control the light amount of a subject passing through the image capturing optical system, between the subject side and a formed image side of the predetermined lens units, and the predetermined lens units are shifted to positions out of the optical axis without changing the mutual positional relationship of the predetermined lens units.

Structure 2

In the lens barrel described in Structure 1, the predetermined lens units which are shifted to the positions out of the optical axis, are supported by an integrally formed lens frame.

Structure 3

In the lens barrel described in Structure 1, the predetermined lens units are shifted to the positions out of the optical axis, while leaving behind the light-amount control member on the optical axis.

Structure 4

In the lens barrel described in Structure 1, any lens unit is not placed between any lens unit of the predetermined lens units which is placed at the subject side of the light-amount control member, and the light-amount control member, and further, any lens unit is not placed between another lens unit of the predetermined lens units which is placed at the image side of the light-amount control member, and the light-amount control member.

Structure 5

In the lens barrel described in Structure 1 or 2, the light-amount control member is represented by an aperture diaphragm, a shutter and/or a neutral density filter.

Structure 6

A camera including the lens barrel described in any one of Structures 1 to 5.

Regarding the effects of this invention, based on the invention described in any one of Structures 1 to 5, the lens units, placed while sandwiching the light-amount control member between the subject side and the formed image side, are shifted so that the length of the retracted lens barrel is shortened, and when the plural shifted lens units are returned into the optical axis, they are correctly positioned on the optical axis, and further, even when this shift is repeated, no positional error is generated, resulting in the lens barrels having no individual differences of the image capturing characteristics.

Based on the invention described in Structure 6, the cameras are obtained which have no individual differences of the image capturing characteristics and are able to capture images of high quality.

DESCRIPTION OF THE PREFERRED EMBODIMENTS

The present invention will now be explained via embodiments, however the present invention is not limited to these embodiments.

Figure 1A:
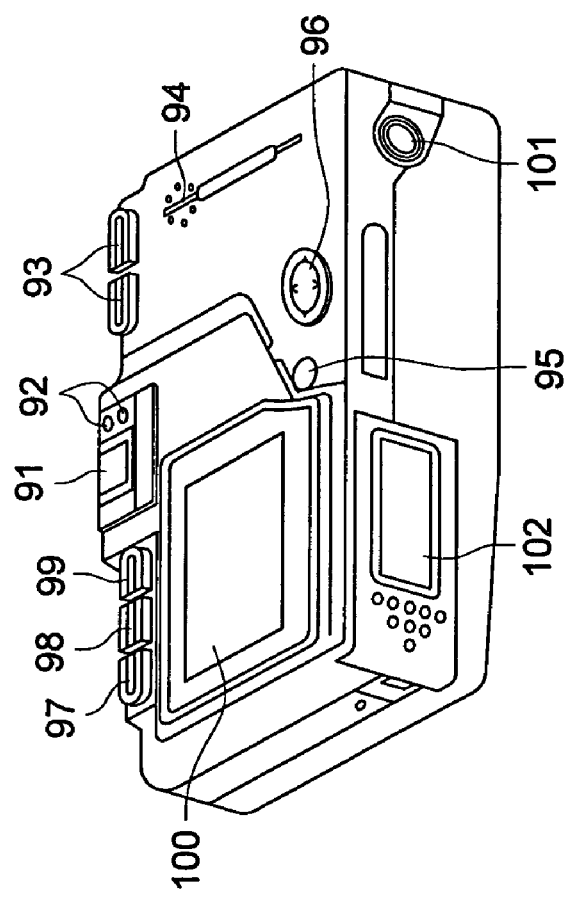
FIGS. 1(a) and (b) are outline views showing an example of a digital camera incorporating the lens barrel relating to the present invention.

FIGS. 1(a) and (b) are outline views showing an example of a digital camera incorporating the lens barrel relating to the present invention. FIG. 1(a) is a front view of the digital camera, while FIG. 1(b) is a rear view of the same camera.

In FIG. 1(a), numeral 81 represents a lens barrel, which extends from a camera, and which includes a zooming optical system structured of plural lens units, and further extended for image capturing, while retracted for carrying. Numeral 82 represents a view finder, numeral 83 represents a shutter release button, numeral 84 represents a flash window, numeral 86 represents a microphone, numeral 87 represents a strap anchor attachment, and numeral 88 represents a connecting terminal for such as a USB terminal, to communicate with an external device.

Shutter release button 83 works as a preparative operation for image capturing by a shallow press, that is, image focusing and measuring of the amount of light are conducted, and exposure is conducted by a deep press.

Figure 1B:
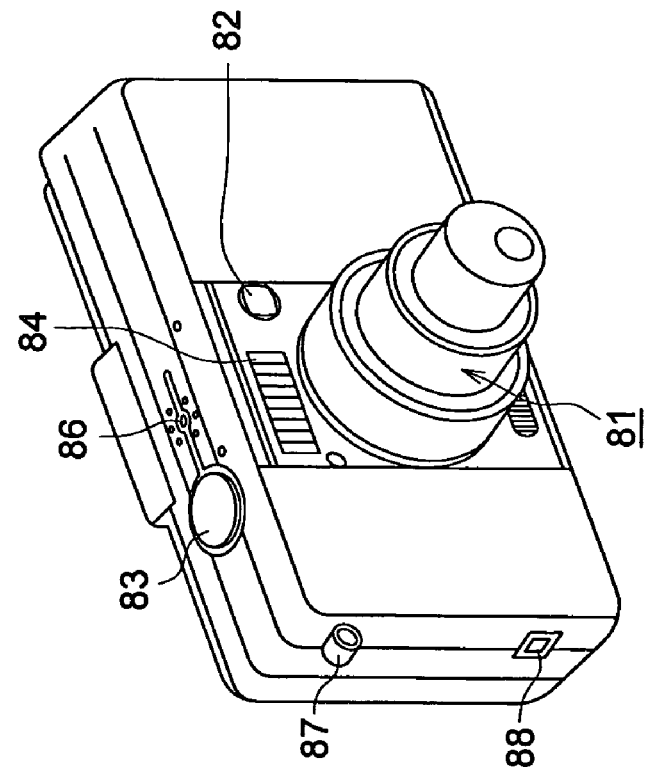

In FIG. 1(b), numeral 91 represents a finder eyepiece, numeral 92 represents display lamps of red and green, which displays AF (automatic focus) and AE (automatic exposure control) information by lighting or blinking to the user when switch S1 is turned on. Numeral 93 represents zooming buttons for zooming up or zooming down. Numeral 94 represents a speaker to replay voices and sounds recorded by microphone 86, or to produce the shutter release sound. Numeral 95 represents a menu/set button, numeral 96 represents a four directional selection buttons, numeral 100 represents an image display section to display the images or textual information. Various menus can be displayed on image display section 100 via menu/set button 95, after which the menu is selected via selection button 96, and the selected menu is set by menu/set button 95. Numeral 97 represents a replay button to replay the captured images. Numeral 98 represents a display button to select "display" or "non-display" of the captured images or textual information displayed on image display section 100. Numeral 99 represents a clear button to erase the captured images. Numeral 101 represents a threaded hole to attach a tripod stand, and numeral 102 represents a lid of a battery/memory card chamber, in which a battery for supplying an electrical power to the camera as well as a removable memory card to record the captured images are stored.

Lens barrel 81 will now be detailed as follows.

Figure 2:
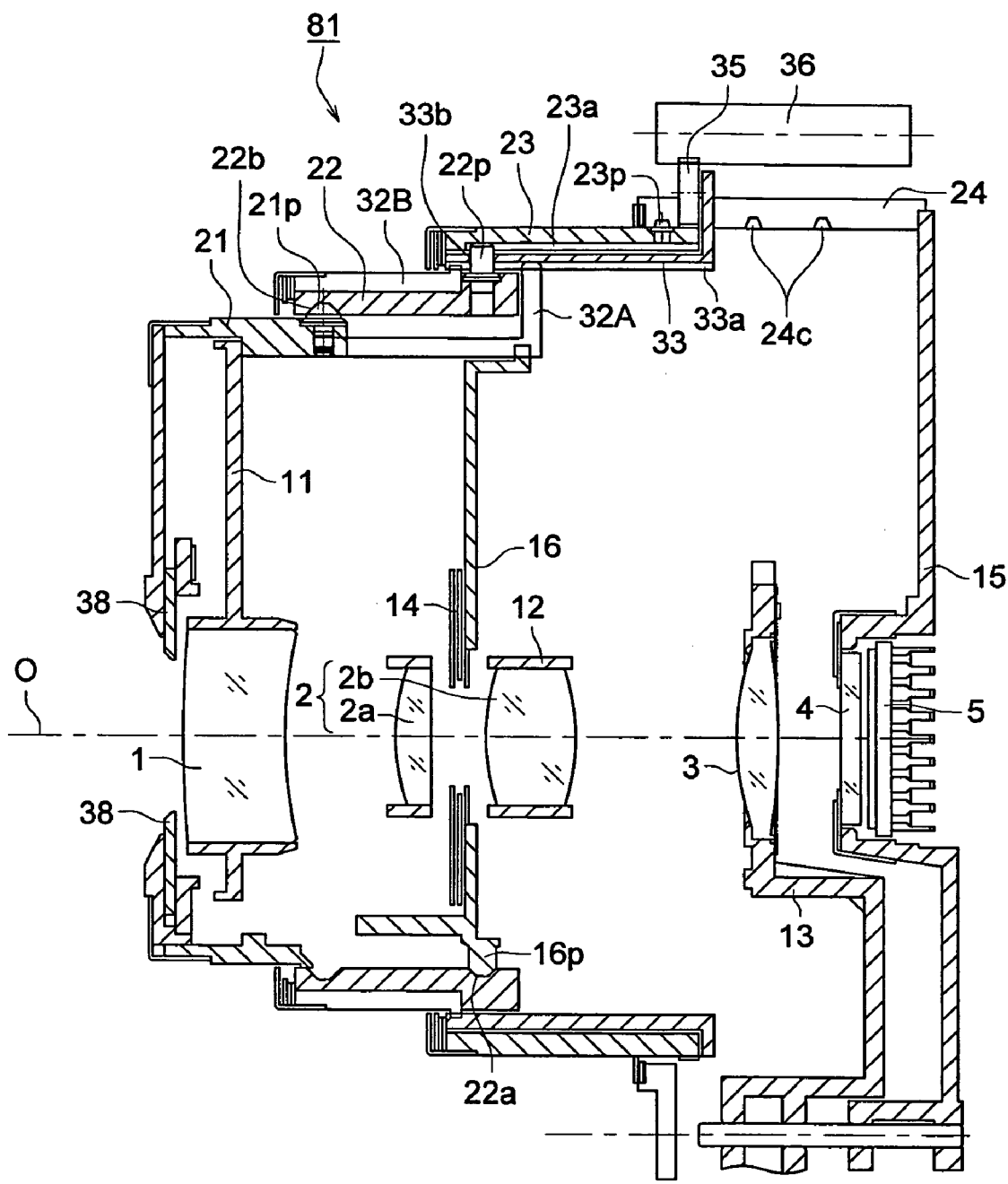
FIG. 2 is a cross-sectional view of a lens barrel in a wide angled condition relating to the present invention.

FIG. 2 is a cross-sectional view of lens barrel 81 set in a wide angle condition relating to the present invention.

In FIG. 2, "O" represents an optical axis, numeral 1 represents a first lens unit, numeral 2 represents a second lens unit, numeral 3 represents a third lens unit, and numeral 4 represents an optical filter in which an infra-red cut filter and an optical low pass filter are stacked. These several members structure the image capturing optical system. Numeral 5 represents an image capturing element. Second lens unit 2 sandwiches shutter unit 14 being the light-amount control member to control the amount of light from the subject, and further second lens unit 2 is structured of lens unit 2a positioned toward the subject side and lens unit 2b positioned toward the image surface side.

In the present embodiment, shutter unit 14 is used for the light-amount control member in these explanations, in addition, a diaphragm-shutter unit structured of a diaphragm and a shutter can also be used for the light-amount control member in these explanations.

Numeral 11 represents a first lens unit frame which is supported by front barrel 21 and supports first lens unit 1. Numeral 12 represents a second lens unit frame to support second lens unit 2 which is structured of lens units 2a and 2b. Second lens unit frame 12 is supported by second lens unit shiftable frame 16, and is structured to pivot to escape from optical axis "O". Numeral 14 represents a shutter unit supported by second lens unit shiftable frame 16. Numeral 13 represents a third lens unit frame to support third lens unit 3, and is structured to be movable along optical axis "O" by a stepping motor, which is not illustrated. Third lens unit frame 13 is independently movable so that focusing is conducted via the movement of third lens unit 3. Numeral 15 represents a base to support optical filter 4 and image capturing element 5.

Next, the operation of lens barrel 81 will be detailed.

In FIG. 2, fixed barrel 24 is mounted on base 15. Cam groove 24c is formed inside fixed barrel 24. Numeral 23 represents an intermediate barrel which is rotated by intermediate barrel drive gear 35 through a motor and a reduction gear train, both of which are not illustrated, and columnar gear 36. Via the rotation of intermediate barrel 23, cam pin 23p in intermediate barrel 23 is guided through cam groove 24c formed in fixed barrel 24 so that intermediate barrel 23 can move along optical axis "O".

Guide ring 33 is engaged to a direct advance guide section 33a which is formed in fixed barrel 24, and thereby guide ring 33 can straightly move parallel to optical axis "O", that is, when intermediate barrel 23 moves along optical axis "O", guide ring 33 straightly moves parallel to optical axis "O", while supporting intermediate barrel drive gear 35. Cam groove 33b and direct advance guide section 33a are formed in guide ring 33.

Cam pin 22p, to engage to intermediate barrel 23 and guide ring 33, is formed in cam barrel 22. When intermediate barrel 23 engaging cam pin 22p rotates, cam barrel 22 also rotates, and thereby cam barrel 22 can move in optical axial direction "O", while being guided by cam groove 33b formed in guide ring 33 to which cam pin 22p is engaged. That is, cam pin 22p is engaged to not only key groove 23a formed parallel to the optical axis of intermediate barrel 23 but also engaged to cam groove 33b formed in guide ring 33. Cam grooves 22a and 22b are formed on the inner surface of cam barrel 22, to guide front barrel 21 and second lens unit shiftable frame 16, respectively.

Direct advance guide 32A is engaged to a direct advance guide section 33a, formed on guide ring 33, which allows direct advance in optical axial direction "O", and thereby as cam barrel 22 moves in optical axial direction "O", direct advance guide 32A also moves in optical axial direction "O". Cover barrel 32B is engaged to the direct advance guide section 33a formed in guide ring 33, which allows direct advance in optical axial direction "O", and thereby as cam barrel 22 moves in optical axial direction "O", cover barrel 32B straightly moves in optical axial direction "O".

Front barrel 21 features cam pin 21p which is engaged to cam groove 22a formed in cam barrel 22, and front barrel 21 is also engaged to direct advance guide 32A. Further, second lens unit shiftable frame 16 features cam pin 16p which is engaged to cam groove 22b formed in cam barrel 22, and further second lens unit shiftable frame 16 is also engaged to direct advance guide 32A.

Accordingly, when cam barrel 22 is rotated, both front barrel 21 and second lens unit shiftable frame 16 are guided by cam grooves 22a and 22b, respectively, and front barrel 21 and second lens unit shiftable frame 16 are directly moved in optical axial direction "O", whereby the distance between first lens unit 1, supported by front barrel 21, and second lens unit 2, supported by second lens unit shiftable frame 16, are changed so that zooming function is conducted.

Zooming from the wide angle position to the telescopic angle position is conducted by the rotation of intermediate barrel drive gear 35, via the motor and reduction gear train which are not illustrated, and columnar gear 36, and further conducted by the rotation of intermediate barrel 23.

Cam barrel 22 is rotated by the rotation of intermediate barrel 23, and front barrel 21 and second lens unit shiftable frame 16 are guided by cam grooves 22a and 22b, respectively, and thereby the distance between first lens unit 1, supported by front barrel 21, and second lens unit 2, supported by second lens unit shiftable frame 16, are changed so that zooming function is conducted resulting in telescopic condition. In addition, if zooming is stopped anywhere between the wide angle position and the telescopic angle position, focusing is of course effectively conducted at that position.

The above description concerns the operation of lens barrel 81.

Figure 3:
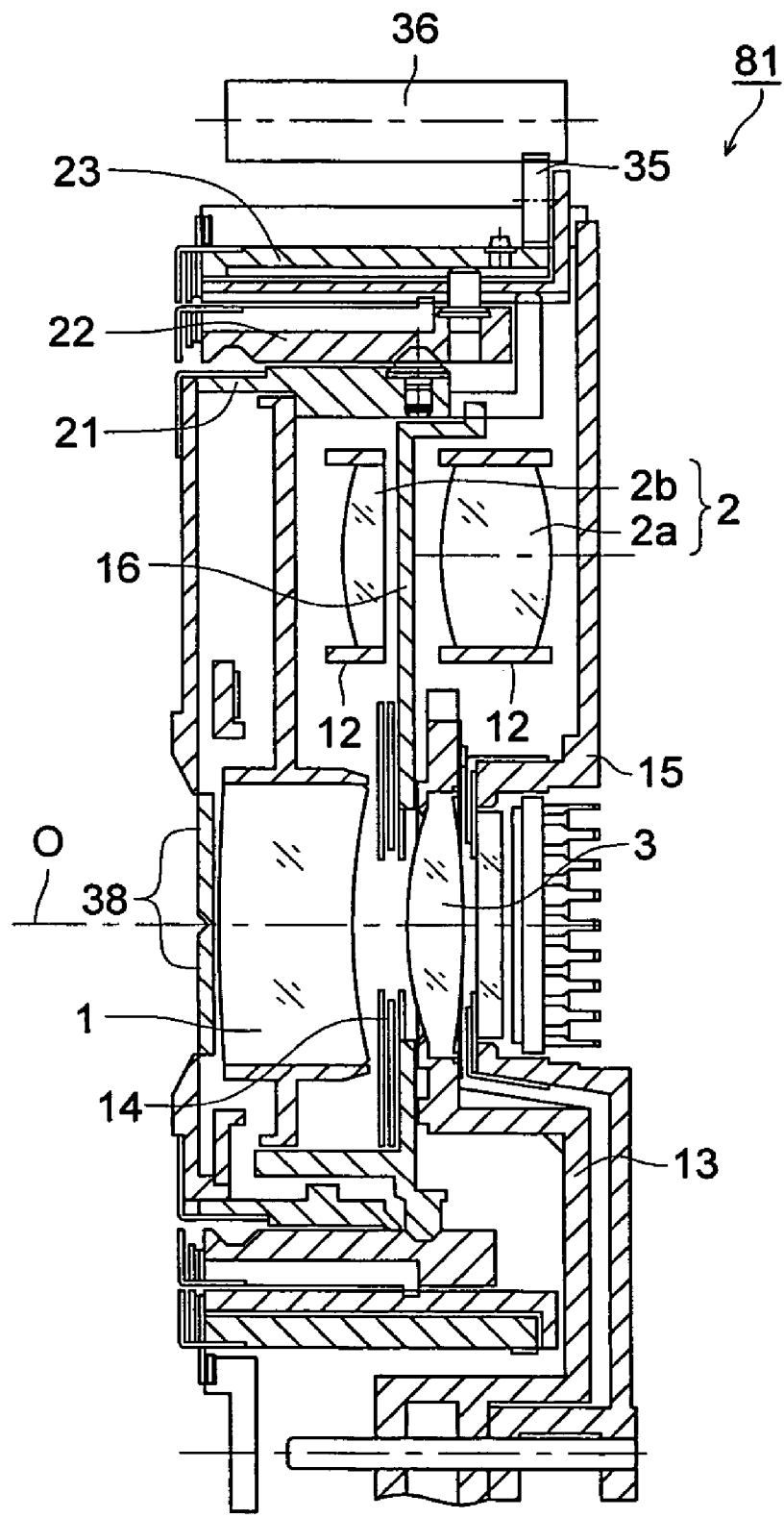
FIG. 3 is a cross-sectional view of a retracted lens barrel relating to the present invention.

FIG. 3 is a cross-sectional view of retracted lens barrel 81 relating to the present embodiment.

The retracted condition of lens barrel 81 in FIG. 3 is obtained by the following procedure. Firstly, lens barrel 81 is in the wide angle condition in FIG. 2. After third lens unit frame 13 is shifted toward base 15, intermediate barrel drive gear 35 is rotated in the reverse direction through the motor and the reduction gears train, neither of which is illustrated, and also through columnar gear 36, whereby intermediate barrel 23 is rotated in the reverse direction, resulting in the retracted condition of lens barrel 81.

By the reverse rotation of intermediate barrel 23, cam barrel 22 is also rotated in the reverse direction. Front barrel 21 and second lens unit shiftable frame 16 are guided by cam grooves 22a and 22b, respectively, to approach each other, and intermediate barrel 23 and cam barrel 22 are shifted toward base 15.

Second lens unit frame 12 supports lens unit 2a and lens unit 2b. Second lens unit frame 12 is supported by second lens unit shiftable frame 16. Second lens unit frame 12 pivots on a shaft which will be described later. Since second lens unit frame 12 rotates on said shaft, second lens unit frame 12 and second lens unit 2, structured of lens unit 2a and lens unit 2b, as shown in FIG. 3, are shifted out of the optical axis, and retracted. However, shutter unit 14 is left behind on the optical axial position, and further, lens unit 2a and lens unit 2b do not change their mutual positional interval.

After which, intermediate barrel 23 and cam barrel 22 move toward base 15, they allow second lens unit shiftable frame 16 and first lens unit 1 to approach each other, and further, allow lens cover 38 to close, resulting in the retracted lens condition shown in FIG. 3.

Figure 4:
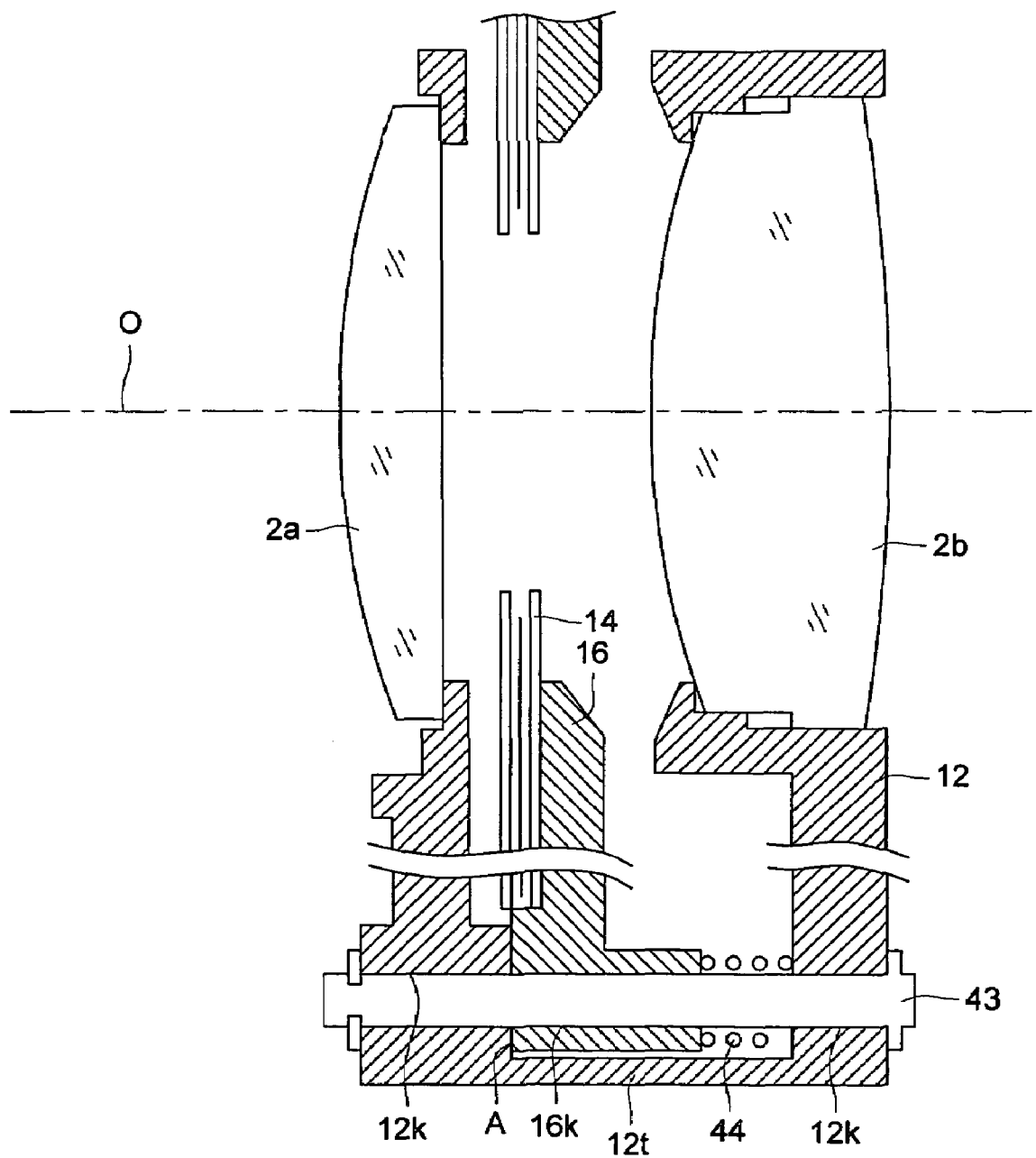
FIG. 4 is a cross-sectional view showing an example of the structure of a shiftable frame to support a second lens unit.

FIG. 4 is a cross-sectional view showing the structure of second lens unit frame 12 which is supported by second lens unit shiftable frame 16.

In FIG. 4, second lens unit 2 is structured of lens unit 2a on the subject side and lens unit 2b on the image side, and further, lens units 2a and 2b sandwich shutter unit 14 which is supported by second lens shiftable frame 16. Yet further, second lens unit 2 is supported by second lens frame 12 integrated with arm 12t.

Two through-holes 12k are formed in second lens unit frame 12, which sandwich through-hole 16k formed in second lens unit shiftable frame 16. Two through-holes 12k and through-hole 16k are rotatably supported by shaft 43. Further, helical torsion spring 44 is assembled in shaft 43 to push second lens unit frame 12 in a predetermined direction. Due to this, second lens unit frame 12 pivots on shaft 43, and lens units 2a and 2b can be pivoted out of the optical axis, while lens units 2a and 2b do not change the interval between each other.

Figure 5:
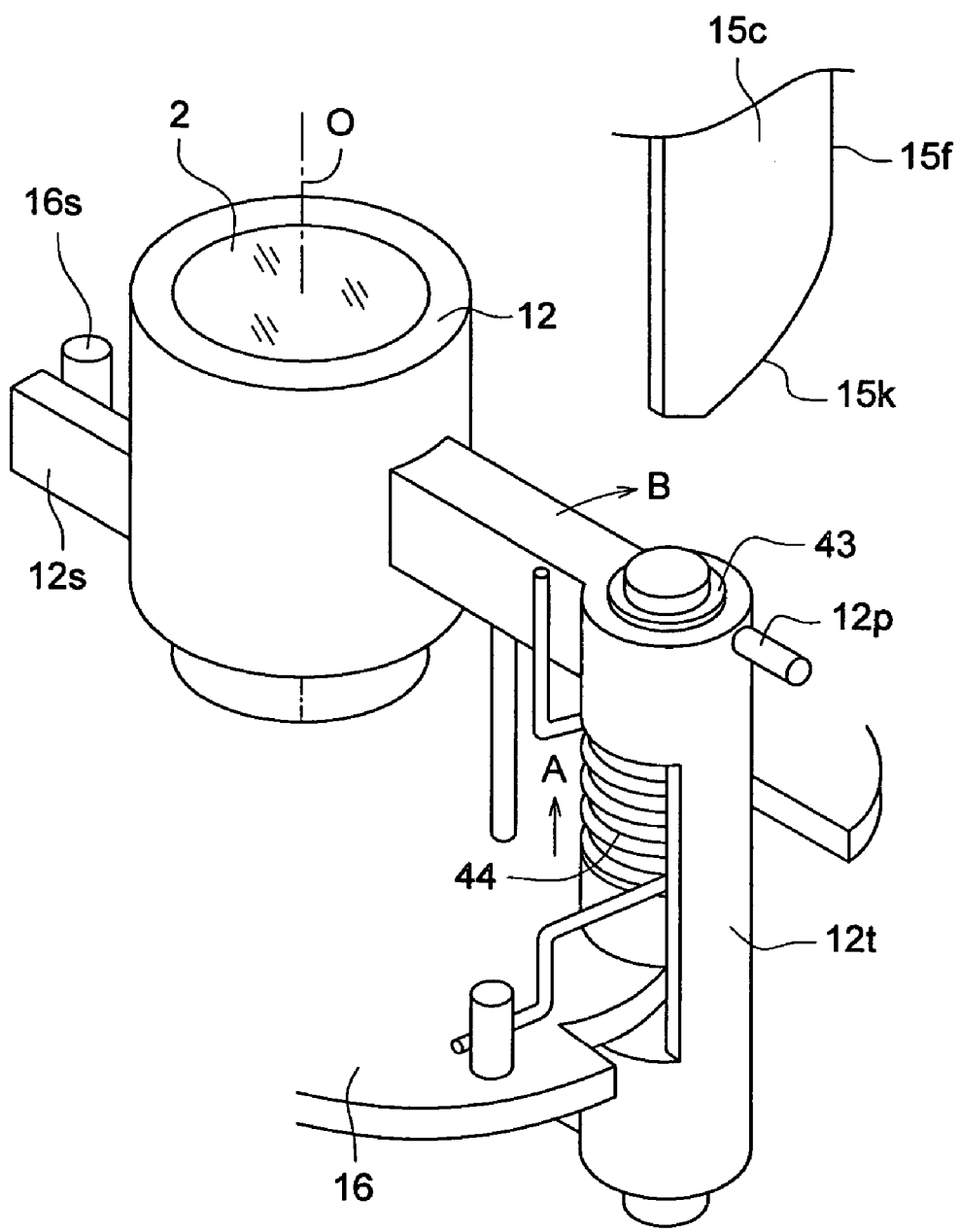
FIG. 5 is a perspective view showing an example of a mechanism of the shiftable frame of the second lens unit shown in FIG. 4.

FIG. 5 is a perspective view showing an example of a pivoting structure of second lens unit frame 12 shown in FIG. 4. In FIG. 5, second lens unit frame 12 is viewed from the image capturing element, wherein the lens barrel is expanded, and second lens unit 2 is positioned on optical axis "O" so that image capturing can be conducted. In addition, FIG. 5 shows second lens unit frame 12 and its mechanical section, without showing any other surrounding members.

Helical torsion spring 44 pushes second lens unit frame 12 via its coils in allowed direction A in FIG. 5, and also second lens unit frame 12 via both ends in allowed direction B. Raised portion 12s formed on second lens unit frame 12 engages stopper pin 16s formed on second lens shiftable frame 16, whereby, second lens unit frame 12, that is, second lens unit 2 is positively positioned in optical axis "O". Numeral 15c represents a cam plate formed on base 15. In the image capturing condition, after the lens barrel was expanded, cam plate 15c is positioned in a condition separated from second lens unit frame 12.

When the lens barrel is driven to the retracted condition, second lens unit shiftable frame 16 is shifted upward in FIG. 5, slope section 15k formed in cam plate 15c comes into contact with pin 12p formed on second lens unit frame 12, whereby, second lens unit frame 12 is allowed to rotate along slope section 15k, while reacting to the pushing power of helical coiled spring 44. Due to this action, second lens unit frame 12 is rotated around shaft 43 in the direction reverse to allowed direction B, and is thereby moved to the position retired from optical axis "O".

Yet further, second lens unit shiftable frame 16 is further shifted upward in FIG. 5 so that straight section 15f formed on cam plate 15c comes into contact with pin 12p, and second lens unit frame 12 is secured in the position retired from optical axis "O".

Thus, lens barrel 81 is retracted as shown in FIG. 3.

As detailed above, the lens barrel of the present embodiment is structured so that when the lens barrel is retracted, lens units 2a and 2b, including the shutter unit and the diaphragm serving as the light-amount control member to control the light emitted from the subject and passing through the image capturing optical system, between the subject side and the image side, can be shifted out of the optical axis, without changing the interval between lens units 2a and 2b. Accordingly, even when the relative position of the lens units is very sensitive to focusing, the lens units can be pivoted out of the optical axis, without changing their mutual relative position. In addition, in the lens barrel of the present embodiment, no axial disagreement is caused, further, no recurring error results, so that captured image can be created, having uniformly flat evenness on peripheral sections of the image plane, yet further, there is no difference among the images captured by different cameras using said lens barrel.

In addition, since the lens unit to be retired from the optical axis is supported by the integrally formed lens frame, the optical axes of the lens units sandwiching the light-amount controlling member can be easily adjusted, and the lens unit and the frame are integrally pivoted, and thereby no axial disagreement is caused. Further, no recurring error results, captured images can be created, having evenness on the peripheral parts of the captured image. Yet further, there is no difference among the images captured by plural cameras using said lens barrel.

Yet further, since the lens units 2a and 2b, which were positioned the light control member in between, are retired from the optical axis, when the lens barrel is retracted, the lens barrel can be shortened to result in a thinner camera model.

Additionally, in the above explanation, helical torsion spring 44 is placed at the image side of second lens unit shiftable frame 16, however it is also possible to place helical torsion spring 44 at the subject side of second lens unit shiftable frame 16.

The structure explained in the present embodiment is only an example, and the structure is not limited to the above example. Other structures of the lens units which sandwich the light control member, can of course also be shifted out of the optical axis, without changing the mutual positional relationship, would not deviate from scope and sprit of the present invention.

What is claimed is:

1. A retractable lens barrel including an image capturing optical system, comprising:
    a first lens unit for capturing an image of a subject;
    a light-amount control member to control an amount of light which comes from the subject and passes through the image capturing optical system;
    a second lens unit including at least two lens units which sandwich the light-amount control member on an optical axis;
    a second lens unit frame which supports the at least two lens units included in the second lens unit; and
    a drive mechanism to move the second lens unit frame;
    wherein the first lens unit and the second lens unit are adapted to change a distance between the first lens unit and the second lens unit when a zooming function is conducted while maintaining a mutual positional relationship of the at least two lens units and the light-amount control member;
    wherein when the retractable lens barrel is extended for image capturing, the first lens unit and the second lens unit exist on the optical axis, while the light-amount control member is sandwiched between the two lens units of the second lens unit on the optical axis, and
    wherein when the lens barrel is retracted, the at least two lens units are shifted together in same direction out of the optical axis by the drive mechanism while maintaining a mutual positional relationship of the at least two lens units.

2. The lens barrel in claim 1, further comprising an integrally formed lens frame, which supports the at least two lens units, wherein the second lens unit frame is supported by the integrally formed lens frame and is configured for shifting the at least two lens units to a position out of the optical axis.

3. The lens barrel in claim 1, wherein the second lens unit is shifted to the position out of the optical axis, while the light-amount control member is left behind on the optical axis.

4. The lens barrel in claim 1, wherein any lens unit is not placed between the light-amount control member and the one lens unit of the second lens units, placed at the subject side of the light-amount control member, and further, any lens unit is not placed between the light-amount control member and the other lens unit of the second lens units, placed at the image side of the light-amount control member.

5. The lens barrel in claim 1, wherein the light-amount control member is represented by at least one of an aperture diaphragm, a shutter, and a neutral density filter.

6. A camera comprising the lens barrel in claim 1.

7. The lens barrel in claim 1, wherein when the lens barrel is retracted, the at least two lens units are shifted to the position out of the optical axis while the light-amount control member is left behind on the optical axis.

8. A retractable lens barrel including an image capturing optical system, comprising:
    a first lens unit for capturing an image of a subject;
    a light-amount control member to control an amount of light which comes from the subject and passes through the image capturing optical system;
    a second lens unit including at least two lens units which sandwich the light-amount control member on an optical axis;
    a second lens unit frame which supports the at least two lens units included in the second lens unit; and
    a drive mechanism to move the second lens unit frame;
    wherein when the retractable lens barrel is extended for image capturing, the first lens unit and the second lens unit exist on the optical axis, while the light-amount control member is sandwiched between the two lens units of the second lens unit on the optical axis, and
    wherein when the lens barrel is retracted, the at least two lens units are shifted together in same direction out of the optical axis by the drive mechanism while maintaining a mutual positional relationship of the at least two lens units.

* * * * *